(12) United States Patent
Erhart et al.

(10) Patent No.: US 10,134,391 B2
(45) Date of Patent: *Nov. 20, 2018

(54) SYSTEM AND METHOD FOR DYNAMIC ASR BASED ON SOCIAL MEDIA

(71) Applicant: Avaya Inc., Basking Ridge, NJ (US)

(72) Inventors: George W. Erhart, Loveland, CO (US); Valentine C. Matula, Granville, OH (US); David J. Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,152

(22) Filed: Mar. 13, 2017

(65) Prior Publication Data

US 2017/0186419 A1   Jun. 29, 2017

Related U.S. Application Data

(63) Continuation of application No. 13/621,086, filed on Sep. 15, 2012, now Pat. No. 9,646,604.

(51) Int. Cl.
*G10L 15/06* (2013.01)
*G06F 15/16* (2006.01)
(Continued)

(52) U.S. Cl.
CPC ...... *G10L 15/065* (2013.01); *G06F 17/30675* (2013.01); *G06F 17/30705* (2013.01); *G06F 17/30746* (2013.01); *G06Q 30/0281* (2013.01); *G06Q 50/01* (2013.01); *G10L 15/02* (2013.01); *G10L 15/063* (2013.01); *G10L 15/30* (2013.01); *G10L 25/51* (2013.01); *H04L 51/32* (2013.01);
(Continued)

(58) Field of Classification Search
CPC ...... G10L 15/20; G10L 15/265; G10L 15/065
USPC ........................................................ 704/244
See application file for complete search history.

(56) References Cited

U.S. PATENT DOCUMENTS

| H2187 H | 4/2007 | Yuchimiuk |
| 7,386,439 B1 * | 6/2008 | Charnock ......... G06F 17/30699 704/9 |

(Continued)

OTHER PUBLICATIONS

Nguyen, Timothy; Office Action dated Sep. 5, 2014; U.S. Appl. No. 13/621,086; United States Patent and Trademark Office; Alexandria, VA.

(Continued)

*Primary Examiner* — Daniel Washburn
*Assistant Examiner* — Timothy Nguyen
(74) *Attorney, Agent, or Firm* — Stevens & Showalter, LLP

(57) ABSTRACT

System and method to adjust an automatic speech recognition (ASR) engine, the method including: receiving social network information from a social network; data mining the social network information to extract one or more characteristics; inferring a trend from the extracted one or more characteristics; and adjusting the ASR engine based upon the inferred trend. Embodiments of the method may further include: receiving a speech signal from a user; and recognizing the speech signal by use of the adjusted ASR engine. Further embodiments of the method may include: producing a list of candidate matching words; and ranking the list of candidate matching words by use of the inferred trend.

20 Claims, 6 Drawing Sheets

(51) Int. Cl.
*G10L 15/065* (2013.01)
*H04M 3/51* (2006.01)
*H04L 12/58* (2006.01)
*G06Q 50/00* (2012.01)
*G06Q 30/02* (2012.01)
*G10L 15/30* (2013.01)
*G10L 15/02* (2006.01)
*G10L 25/51* (2013.01)
*G06F 17/30* (2006.01)

(52) U.S. Cl.
CPC ... *H04M 3/5191* (2013.01); *G10L 2015/0635* (2013.01); *H04M 2201/40* (2013.01); *H04M 2203/40* (2013.01)

(56) References Cited

U.S. PATENT DOCUMENTS

| | | | |
|---|---|---|---|
| 7,600,017 B2* | 10/2009 | Holtzman | G06F 17/2745 709/224 |
| 8,438,089 B1* | 5/2013 | Wasserblat | G06Q 40/02 704/270 |
| 8,478,826 B2 | 7/2013 | Erhart et al. | |
| 8,606,781 B2* | 12/2013 | Chi | G06F 17/30867 707/734 |
| 8,644,487 B2 | 2/2014 | Erhart et al. | |
| 8,867,730 B2 | 10/2014 | Erhart et al. | |
| 2002/0062368 A1* | 5/2002 | Holtzman | G06F 21/31 709/224 |
| 2002/0116196 A1* | 8/2002 | Tran | G06F 1/3203 704/270 |
| 2004/0260543 A1 | 12/2004 | Horowitz et al. | |
| 2006/0116877 A1* | 6/2006 | Pickering | G10L 15/08 704/231 |
| 2007/0106685 A1 | 5/2007 | Houh et al. | |
| 2007/0208614 A1* | 9/2007 | Arnett | G06F 21/31 705/7.31 |
| 2009/0106028 A1* | 4/2009 | Dhanakshirur | G10L 15/065 704/270.1 |
| 2009/0157404 A1* | 6/2009 | Brown | G10L 15/19 704/257 |
| 2010/0145699 A1* | 6/2010 | Tian | G10L 15/07 704/257 |
| 2010/0228548 A1 | 9/2010 | Liu et al. | |
| 2010/0235218 A1 | 9/2010 | Erhart et al. | |
| 2011/0047229 A1* | 2/2011 | Sinha | G06F 9/543 709/206 |
| 2011/0106527 A1* | 5/2011 | Chiu | H04M 3/4936 704/9 |
| 2011/0123015 A1 | 5/2011 | Erhart et al. | |
| 2011/0125550 A1 | 5/2011 | Erhart et al. | |
| 2011/0125580 A1 | 5/2011 | Erhart et al. | |
| 2011/0125697 A1 | 5/2011 | Erhart et al. | |
| 2011/0125793 A1 | 5/2011 | Erhart et al. | |
| 2011/0125826 A1* | 5/2011 | Erhart | G06Q 10/10 709/202 |
| 2011/0161076 A1* | 6/2011 | Davis | G06F 3/04842 704/231 |
| 2011/0276513 A1 | 11/2011 | Erhart et al. | |
| 2011/0288897 A1* | 11/2011 | Erhart | G06F 17/30705 705/7.13 |
| 2012/0016678 A1* | 1/2012 | Gruber | G06F 17/3087 704/275 |
| 2012/0053935 A1* | 3/2012 | Malegaonkar | G10L 15/07 704/235 |
| 2012/0158854 A1* | 6/2012 | Loofbourrow | H04L 51/32 709/206 |
| 2013/0262106 A1* | 10/2013 | Hurvitz | G10L 15/183 704/235 |
| 2014/0081636 A1 | 3/2014 | Erhart et al. | |
| 2015/0127558 A1 | 5/2015 | Erhart et al. | |

OTHER PUBLICATIONS

Nguyen, Timothy; Advisory Action dated Apr. 16, 2015; U.S. Appl. No. 13/621,086; United States Patent and Trademark Office; Alexandria, VA.

Nguyen, Timothy; Office Action dated Jul. 15, 2015; U.S. Appl. No. 13/621,086; United States Patent and Trademark Office; Alexandria, VA.

Nguyen, Timothy; Final Office Action dated Feb. 24, 2015; U.S. Appl. No. 13/621,086; United States Patent and Trademark Office; Alexandria, VA.

Nguyen, Timothy; Final Office Action dated Feb. 2, 2016; U.S. Appl. No. 13/621,086; United States Patent and Trademark Office; Alexandria, VA.

Nguyen, Timothy; Office Action dated Jun. 28, 2016; U.S. Appl. No. 13/621,086; United States Patent and Trademark Office; Alexandria, VA.

* cited by examiner

SYSTEM AND METHOD FOR DYNAMIC ASR BASED ON SOCIAL MEDIA

CROSS-REFERENCE TO RELATED APPLICATIONS

This application is a continuation of U.S. patent application Ser. No. 13/621,086, filed on Sep. 15, 2012, the entirety of which is incorporated herein by reference in its entirety.

BACKGROUND

1. Field of the Invention

Embodiments of the present invention generally relate to dynamic automatic speech recognition (ASR), and, in particular, to a system and method for dynamically altering ASR operation based upon information mined from social networking sources.

2. Description of Related Art

Contact centers generally exchange information with consumers through directed contacts. Directed contacts consist of emails, phone calls, or other forms of communication that are directed to the contact center or the consumer. However, many people today exchange information or interact through non-direct methods. Non-direct communications require users to post communications to third party sites or forums, but not to direct those communications to a specific person or organization. Non-direct communication methods include social media, which may include websites, networks, blogs, micro-blogs, RSS feeds, social media websites (such as, LinkedIn®, Facebook®, Twitter®, MySpace®, etc.), and other types of social media.

Consumers are finding it useful to ask their questions, complain about service, and compliment companies in the public forum of social media. Social media is often a "canary in a coal mine" (i.e., an early indicator) for possible service-affecting events because social media users typically express themselves on social media channels before using traditional channels like voice. The addition of social media to valid contact center channels increases the overall coverage required by today's contact center. However, contact centers have limited amounts of resources. The burden of keeping other, traditionally static, contact center self-service channels current, efficient, and useful becomes a difficult problem. Therefore, traditional contact centers do not react to trends in social media that duplicate trends from other channels like voice dialog via interactive voice response (IVR). Delays in addressing a customer crisis results in lost time and money for a business.

Therefore, a need exists to adapt speech grammars recognized by contact center channels, based on real-time trending events detected from social media, in order to provide high customer satisfaction, efficient call handling, and minimizing the burden on today's contact center resources.

BRIEF SUMMARY

Embodiments in accordance with the present invention provide a system and method to adjust an automatic speech recognition (ASR) engine, the method including: receiving social network information from a social network; data mining the social network information to extract one or more characteristics; inferring a trend from the extracted one or more characteristics; and adjusting the ASR engine based upon the inferred trend. Embodiments of the method may further include: receiving a speech signal from a user; and recognizing the speech signal by use of the adjusted ASR engine. Further embodiments of the method may further include: producing a list of candidate matching words; and ranking the list of candidate matching words by use of the inferred trend.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" may be used interchangeably herein. It is also to be noted that the terms "comprising", "including", and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer may read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention may be separately claimed.

The term "in communication with" as used herein refers to any coupling, connection, or interaction using electrical signals to exchange information or data, using any system, hardware, software, protocol, or format.

A user context, an extended user context, and/or a user social context as used herein means information about a user of a social media network that may be used to determine a "value" of that user.

The term "social media network" or "social media" is a service provider that builds online communities of people, who share interests and/or activities, or who are interested in exploring the interests and activities of others. Generally, social media are web-based and provide a variety of ways for users to interact, such as e-mail and instant messaging services.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
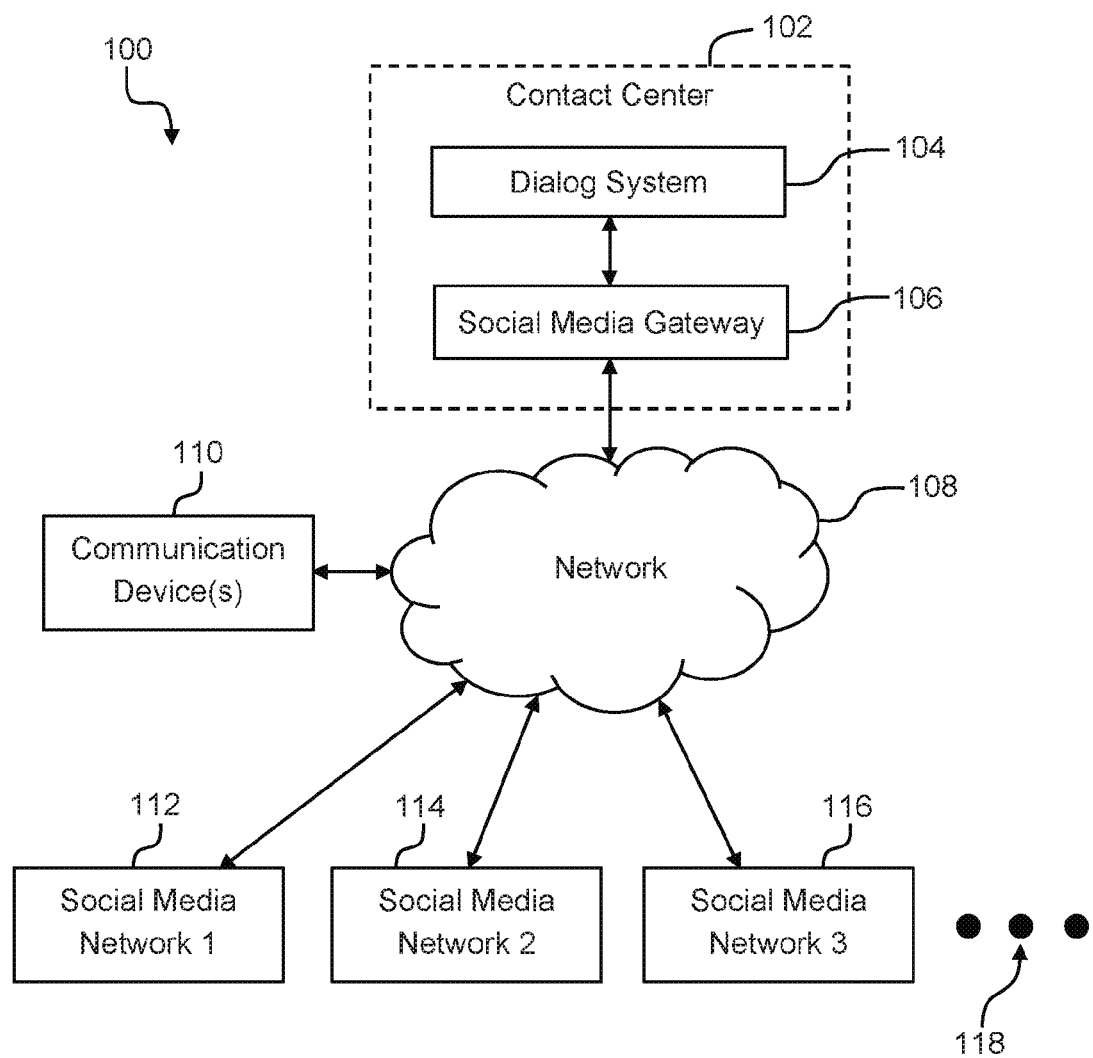
FIG. 1 is a block diagram of an embodiment of a communication system, operable to interact with persons using a social media network.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Social media channels are gaining momentum as a platform for delivering and receiving customer support. Consumers are finding it useful to ask their questions, complain about service, and compliment companies in the public forum of social media. The addition of social media to valid contact center channels increases the overall convergence required by today's contact center. The burden of keeping other, traditionally static, contact center self-service channels current, efficient, and useful becomes a difficult problem.

Customers benefit from efficient interactive voice response (IVR) systems that make the most common menu choices and options easy to find and simple to navigate. This becomes very difficult when deploying a static system with many options and many levels of menus. Furthermore, the need may arise to move menu items around based on time of day, current events, or trending problems.

Automatic speech recognition (ASR) may help with some of the difficulties of multilevel menu navigation. However, ASR is not perfect. ASR is not 100% accurate in recognizing words/phrases that are known to its vocabulary, and it is 100% wrong on words/phrases that are not known to its vocabulary. Recognizing speech regardless of the speaker is a challenge. When the system is uncertain, choices must be made based on confidence scores. Real-time data about trending problems may help determine a preferred choice when indicators such as confidence scores do not produce a clearly preferred option. An advantage of using social media trends is to expand (or contract) the size of the vocabulary to improve the likelihood of a correct match when a caller speaks on an unexpected topic that is showing up as a trend on social media. The adjustments provided by tracking social media trends may include vocabulary expansion (or contraction) and modifying probabilities (e.g., weights and/or penalties) of existing vocabulary as a reaction to identified trends. Embodiments may apply a trending "bonus" after speech recognition to modify the confidence scores, but a disadvantage is that this bonus may be applied only for terms that have been recognized, and may not be applied to new terms not already within the vocabulary of an ASR engine. Therefore, adapting contact center channels based on real-time trending events may be critical to achieving high customer satisfaction, efficient call handling, and minimizing the burden on today's contact center resources. For example, delays in addressing a customer crisis may result in lost time and money for the business.

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize social media sources to dynamically alter ASR operation.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request may be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

As used herein in connection with embodiments of the present invention, the term "empower" refers to an ability by a party (e.g., a customer) to exercise rights, abilities, functions and so forth, which had been formerly and exclusively reserved for exercise by another party (e.g., a service agent).

The terms "switch," "server," "contact center server," or "contact center computer server" as used herein should be understood to include a Private Branch Exchange (PBX), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes, or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, and any combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements of the embodiment without departing from the spirit and scope of the appended claims.

A communication system 100, for interacting with persons using social media is shown in FIG. 1. The communication system 100 may include a contact center 102, a network 108, and one or more types of social media networks or systems, such as social media network 1 112, social media network 2 114, and/or social media network 3 116. Social media networks 112, 114, and/or 116 may be any social media including, but not limited to, networks, websites, or computer enabled systems. For example, a social media network may be MySpace®, Facebook®, Twitter®, LinkedIn®, Spoke®, or other similar computer enabled systems or websites. The communication system 100 may communicate with more or fewer social media networks 112, 114, and/or 116 than those shown in FIG. 1, as represented by ellipsis 118.

The network 108 may be any network or system operable to allow communication between the contact center 102 and the one or more social media networks 112, 114, and/or 116. The network 108 may represent any communication system, whether wired or wireless, using any protocol and/or format. The network 108 provides communication capability for the contact center 102 to communicate with websites or systems corresponding to the one or more social media networks 112, 114, and/or 116. However, the network 108 may represent two or more networks, where each network is a different communication system using different communication protocols and/or formats and/or different hardware and software. For example, network 108 may be a wide area network, local area network, the Internet, a cellular telephone network, or some other type of communication system. The network 108 may be as described in conjunction with FIGS. 5 and 6.

A contact center 102 may be a system that may communicate with one or more persons who use social media networking sites 112, 114, and/or 116. The contact center 102 may be hardware, software, or a combination of hardware and software. The contact center 102 may be executed by one or more servers or computer systems, as described in conjunction with FIGS. 5 and 6. The contact center 102 may include all systems, whether hardware or software, that allow the contact center 102 to receive, service, and respond to directed and non-directed contacts. For example the contact center 102 may include the telephone or email system, an interface to human agents, systems to allow human agents to service and respond to received contacts, and one or more systems operable to analyze and improve the function of agent interaction.

The contact center 102 may include a dialog system 104 and a social media gateway 106. While the dialog system 104 and the social media gateway 106 are shown as being a part of the contact system 102, in other embodiments, the dialog system 104 and/or the social media gateway 106 may be separate systems or functions executed separately from the contact center 102 and/or executed by a third party. The dialog system 104 may process and receive messages. The social media gateway 106 may receive and translate messages from the one or more social media networks 112, 114, and/or 116. An embodiment of the dialog system 104 is described in conjunction with FIG. 2B. An embodiment of the social media gateway 106 is described in conjunction with FIG. 2A.

The contact center 102 may also communicate with one or more communication devices 110. The communication devices 110 may represent a customer's or user's cell phone, email system, personal digital assistant, laptop computer, or other device that allows the contact center 102 to interact with the customer. The contact center 102 may modify a non-direct contact, from a social media network 112, 114, and/or 116, into a directed contact by sending a response message directly to a customer's communication device 110.

Figure 2A:
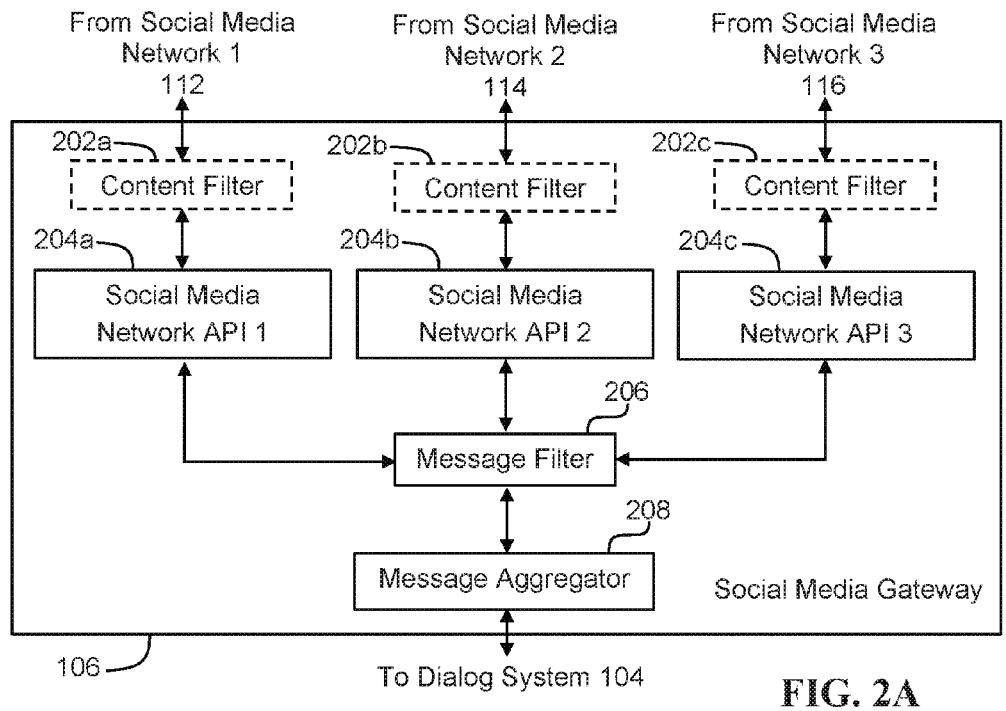
FIG. 2A is a block diagram of an embodiment of a social media gateway.

An embodiment of the social media gateway 106 is shown in FIG. 2A. The social media gateway 106 may include one or more components which may include hardware, software, or a combination of hardware and software. The social media gateway 106 may be executed by a computer system, such as those described in conjunction with FIG. 5. However, in other embodiments, the components described in conjunction with FIG. 2A are logic circuits or other specially-designed hardware that are embodied in a field programmable gate array (FPGA) application specific integrated circuit (ASIC), or other hardware.

Herein, the social media gateway 106 may include one or more content filters 202a, 202b, and/or 202c. A content filter 202 may receive all of the messages for the contact center 102 from a social media network 112, 114, and/or 116 and eliminate or delete those messages that do not require a response. For example, a message between two friends on a Facebook® page, if not pertaining to a product or a service of the company operating the contact center 102, may not need a response. As such, the content filter 202 may filter out or delete the non-suitable message from the messages that are received by the social media network application programming interface (API) 1 204a, social media network API 2 204b, and/or social media network API 3 204c. With the content filter 202, the social media network API 204 only needs to translate those messages that should be received by the dialog system 104. Translation typically requires the conversion of the message into a different format.

The content filter 202 is provided with one or more heuristics for filter rules from a filter database (not shown). These filter rules may be created by the external customer or internal user (e.g. agent or administrator) of the communication system 100. Thus, the user or customer of the communication system 100 may customize the filtering of messages from social media networks 112, 114, and/or 116. Further, different rules may be applied to different social media networks 112, 114, and/or 116, as some social media networks 112, 114, and/or 116 may have different types of messages or postings than other types of social media networks 112, 114, and/or 116. While the content filter 202 is shown as part of the social media gateway 106, it is to be appreciated that the content filter 202 may be a part of the social media network API 204. The content filter 202 may correspond to query terms used by the social media network API 204. The content filter 202 or query terms are an argument to the social media network API 204 call.

The social media network API 204 may be an application that the social media network 112, 114, and/or 116 provides to access the social media network 112, 114, and/or 116. Thus, the social media network API 204 is called and connects the social media gateway 106 to the social media network 112, 114, and/or 116. Any suitable filter criteria may be employed for social media API 204. Examples of filter criteria include positive content of the source of posting, an address field, destination or recipient address fields, a time stamp field, a subject matter field, and a message body field. For example, a type of searchable content may be a name of the business enterprise running or employing the contact center 102 and/or the products or services of the enterprise.

The social media gateway 106 may include one or more social media network APIs 204. As shown in FIG. 2A, the social media gateway 106 may include a social media network API 204 for each social media network 112, 114, and/or 116. As such, the social media gateway 106 may interact with each social media network 112, 114, and/or 116 in the particular (often unique) format or protocol used by the social media network 112, 114, and/or 116. Further, when new social media networks are created, the social media gateway 106 may be easily expanded to interact with those social media networks by adding another social media network API 204 (not shown). Where social media networks 112 are more standardized, or use substantially similar formats or protocols, a single social media network API 204 may be shared by multiple social media networks 112, 14, and/or 116.

The social media network API 204 may receive messages from and send messages to the social media network 112, 114, and/or 116. The social media network API 204 may translate a message received from a social media network 112, 114, and/or 116 and send the translated message to a message filter 206. The social media network API 204 may translate the received message into a standard formatted file. For example, the translated message may be represented by an extensible mark-up language (XML) file or other file having a general format. As such, each specific and particular social media network message may be translated into a standard format for use by the dialog system 104. Further, the social media network API 204 may receive a generally or standard formatted response message, from the dialog system 104, and translate that response into a particularly or specifically formatted response message that may be posted to the corresponding social media network 112, 114, and/or 116.

Messages to the contact center 102 are addressed to the contact center 102. For example, a customer may become a "friend" of the contact center 102 on a social media network 114, such as Facebook®. The customer may then address a message to the contact center 102 on Facebook®. This non-direct contact is a message that is not sent directly to the contact center 102 but to the contact center's Facebook® page. In other embodiments, the contact center 102 receives messages not addressed to the contact center 102. For example, the contact center 102 may receive tweets from Twitter® that are "broadcast" rather than addressed to the contact center 102. The contact center 102 may also search for messages or content on the social media networks 112, 114, and/or 116. Exemplary search criteria include customer name, customer profession, customer home address, customer business address, customer employer name, customer educational or professional background, customer hobby, personal or business interests, customer family profile, and the like. Thus, the social media gateway 106 of the contact center 102 may query, gather, or connect to a live feed of data from a social media network 112, 114, and/or 116 and then apply a filter to the indirect information.

Further, the social media network API 204 may also retrieve user context or other extended information from the social media networks 112, 114, and/or 116. User context or other extended information may include historical posts, historical tweets, or other historical communications that a user may have received or sent. Further, user context or other extended information may include, but is not limited to, account information for a user, the user's followers or friends, information on where historical messages were posted (e.g., geo-location, time/date, what type of device, etc.), trending analysis that the social media network 112, 114, and/or 116 might provide the user, etc. Thus, the social media network API 204 may retrieve information that is associated with a user and a social media network 112, 114, and/or 116 but is not necessarily a part of a current message. The social media network API 204 is a gatherer of data, which may be used to determine a value for the user of the social media networks 112, 114, and/or 116.

The translated messages from the social media network API 204 may be received by a message filter 206. The message filter 206 may perform some or all of the functions of the content filter 202 and eliminate messages before being sent to the dialog system 104. However, in other embodiments, the message filter 206 eliminates information from within the messages before the redacted messages are sent to the dialog system 104. For example, a message from a social media network 112 may have three or four interactions between two parties not associated with the contact center 102. Only one of the several postings may be pertinent to the dialog system 104. As such, the message filter 206 may eliminate or delete at least a portion of the other messages for the dialog system 104. Thus, the dialog system 104 receives a message where some of the content of the message has been deleted. The message filter 206 may retrieve heuristics or filter rules from a filter database (not shown), similar to the content filter 202. A substantial difference between the content and message filters 202 and 206 is that the content filter 202 is specific to a particular message format associated with a corresponding social media network 112, 114, and/or 116, while the message filter 206 is applied to a standardized or universal format and is therefore common to multiple social media networks 112, 114, and/or 116. One skilled in the art will understand the type of rules that may be used to filter information from messages such that only pertinent questions, facts, requests, or information is sent to the dialog system 104.

A message aggregator 208 may also be included with the social media gateway 106. The message aggregator 208 may, in contrast to the message filter 206, combine two or more messages into a packet or grouping that is sent to the dialog system 104. Therefore, the message aggregator 208 may interrelate or combine messages based on information within the messages. For example, two messages may be combined based on any of the message fields referenced above, such as the person that posted the message, the subject, the request or question asked, the person to whom the message was sent, or other information that may be pertinent to the dialog system 104. Thus, the dialog system 104 may be able to respond concurrently to two or more messages based on a grouping provided by the message aggregator 208. Regardless of whether the messages are aggregated, each message or grouping of messages may be sent from the social media gateway 106 to the dialog system 104.

The social media gateway 106 may also send responses back to the social media networks 112, 114, and/or 116. A response from an agent in the contact center 102 may be sent to the social media gateway 106. The response may be in a general format and translated. The translated response may then be posted to the appropriate social media network 112, 114, and/or 116 by the social media gateway 106. In other embodiments, the agent may post the response directly to the social media network 112, 114, and/or 116 without sending the response to the social media gateway 106.

Figure 2B:
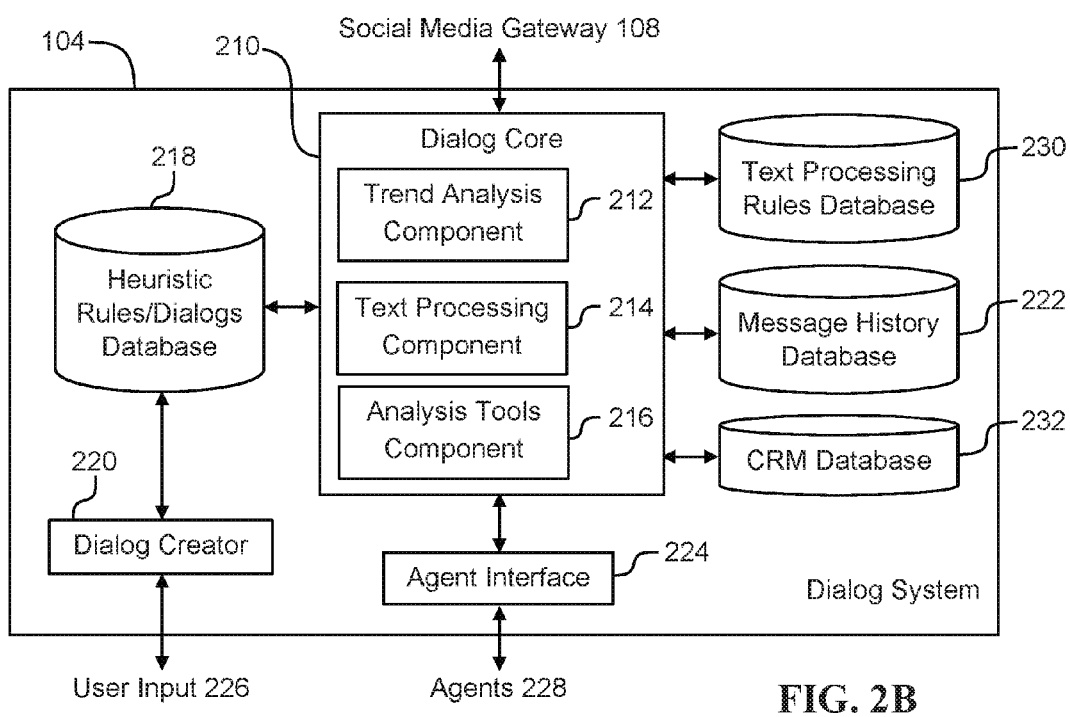
FIG. 2B is a block diagram of an embodiment of a dialog system.

An embodiment of the dialog system 104 is shown in FIG. 2B. The dialog system 104 may include one or more components which may be hardware, software, or a combination of hardware and software. The dialog system 104 may be executed by a computer system such as those described in conjunction with FIGS. 5 and 6. However, in other embodiments, the components described in conjunction with FIG. 2B, are logic circuits or other specially-designed hardware that are embodied in a FPGA or ASIC. The components contained within the dialog system 104 may include a dialog core 210 that is communication with a message history database 222, an agent interface 224, and a heuristic rules and dialogs database 218. Further, the heuristic rules and dialogs database 218 may be in communication with a dialog creator 220.

The dialog core 210 may include one or more sub-components. For example, the dialog core 210 may include a trend analysis component 212, a text processing component 214, and an analysis tools component 216. These components, similar to the components for the dialog system 104, may be hardware, software, or a combination of hardware and software. The dialog core 210 may step through the states of a dialog data structure. A dialog data structure may include a set of inputs and associated actions that may be taken that allow for the automatic and structured response to social media requests or messages. For example, if a user asks for a manual, the input of the text word "manual" may cause the dialog system 104, in accordance with a dialog data structure, to send information about one or more manuals. In turn, the receiver of the response may respond, in kind, with the selection of a certain user manual. In which case, the dialog data structure may then instruct the dialog core 210 to send the user to a website where the user may retrieve an electronic version of the manual. As such, the dialog data structure provides a script a dialog that allows the dialog core 210 to automate the interaction between the contact center 102 and a person. This automation eliminates the need for agent involvement, in some situations, and makes the contact center 102 more efficient and more effective. Further, the automation expands the contact center's ability to answer numerous messages from the plethora of postings on the numerous social media networks 112, 114, and/or 116.

The dialog creator 220 will create a dialog data structure 300 (FIG. 3) that includes instructions for various states for each social media message that comes into the contact center 102. The first instruction might be to send the social media message to the trend analysis component 212, then to the text processing component 214, and then execute a query of a Customer Relationship Management (CRM) database 232 (to determine if this user has an existing order). A CRM database 232 may be a database as described in conjunction with FIGS. 5 and 6 and may store information about customers or other data related to customer relations. Finally the dialog creator 220 might determine that the social media message should be sent to a human agent 228 for processing. The instructions or node transitions are executed in the dialog core 210 and make use of many different components that the dialog creator 220 combines in any way the user desires to handle the social media messages. The dialog core 210 may make use of the trend analysis component 212, text processing component 214, or other systems. The dialog core 210 may also interface with the CRM system and/or database 232, external databases, social media user information (e.g., followers, friends, post history, etc. from the social media site), or other systems.

The trend analysis component 212 is operable to analyze trends that occur between two or more messages received by the social media networks 112, 114, and/or 116. The two messages may be from different social media networks, so that the trend analysis component 212 may identify trends across several different social media networks 112, 114, and/or 116. Trends may include multiple occurrences of the same word or phrase, multiple occurrences of a customer identity, product name or service, or multiple occurrences of some other information that might indicate a trend. Further, the trend analysis component 212 may be able to identify escalations in the occurrences of particular text, identities, or other information, or may identify multiple occurrences over a period of time. The trend analysis component 212 may also be able to apply one or more different algorithms to occurrences of information within the social media networks 112, 114, and/or 116. For example, the trend analysis component 212 may match the number of occurrences of a phrase or word over a period of time and apply analysis to determine if the occurrences are increasing or decreasing over the period of time.

The text processing component 214 is operable to analyze text of one or more messages from social media networks 112, 114, or 116. Some possible methods for text processing may include Regular Expression, Latent Semantic Indexing (LSI), text part of speech tagging, text clustering, N-Gram document analysis, etc. The text processing rules or models may be stored in and/or retrieved from a text processing rules database 230. The text processing rules database 230 may be a database as described in conjunction with FIGS. 5 and 6 that stores rules or models used by the text processing component 214.

The text processing component 214 may identify one or more occurrences of a particular text, such as using one or more of the message fields referenced above, in order to associate that social media message with one or more dialog data structures in the heuristic rules and dialogs database 218. For example, the text processing component 214 may look for the word "manual" in the social media message. If the word "manual" is found, the text processing component 214 may retrieve a dialog data structure from the heuristic rules and dialogs database 218 and, as the dialog data structure instructs, communicate with the customer about one or more owner's manuals, repair manuals, or other types of manuals. In another example, if the social media message includes the words "buy", "sell", "price, "discount" or other types of words that may indicate the user or customer wishes to buy a product, the text processing component 214 may retrieve one or more dialog data structures from the heuristic rules and dialogs database 218 that may provide instructions to assist the customer in purchasing products or services from the enterprise.

The analysis tools component 216 is operable to analyze response messages received back from an agent interface 224. In analyzing the agent's responses, the analysis tools component 216 may determine if the dialog data structures 300 (FIG. 3) originally retrieved by the text processing component 214 met the needs of the customer. In the analysis, the agent 228 may enter one or more items of information, for the analysis tools component 216, about the response and about how the response matched with the dialog data structures 300. The analysis tools component 216 may review the response and determine if it was similar to the response provided by the dialog data structure 300. Thus, the analysis tools component 216 may provide information to the dialog core 210 or the dialog creator 220 to improve the dialog data structures 300 that are included in the heuristic rules and dialogs database 218.

Figure 5:
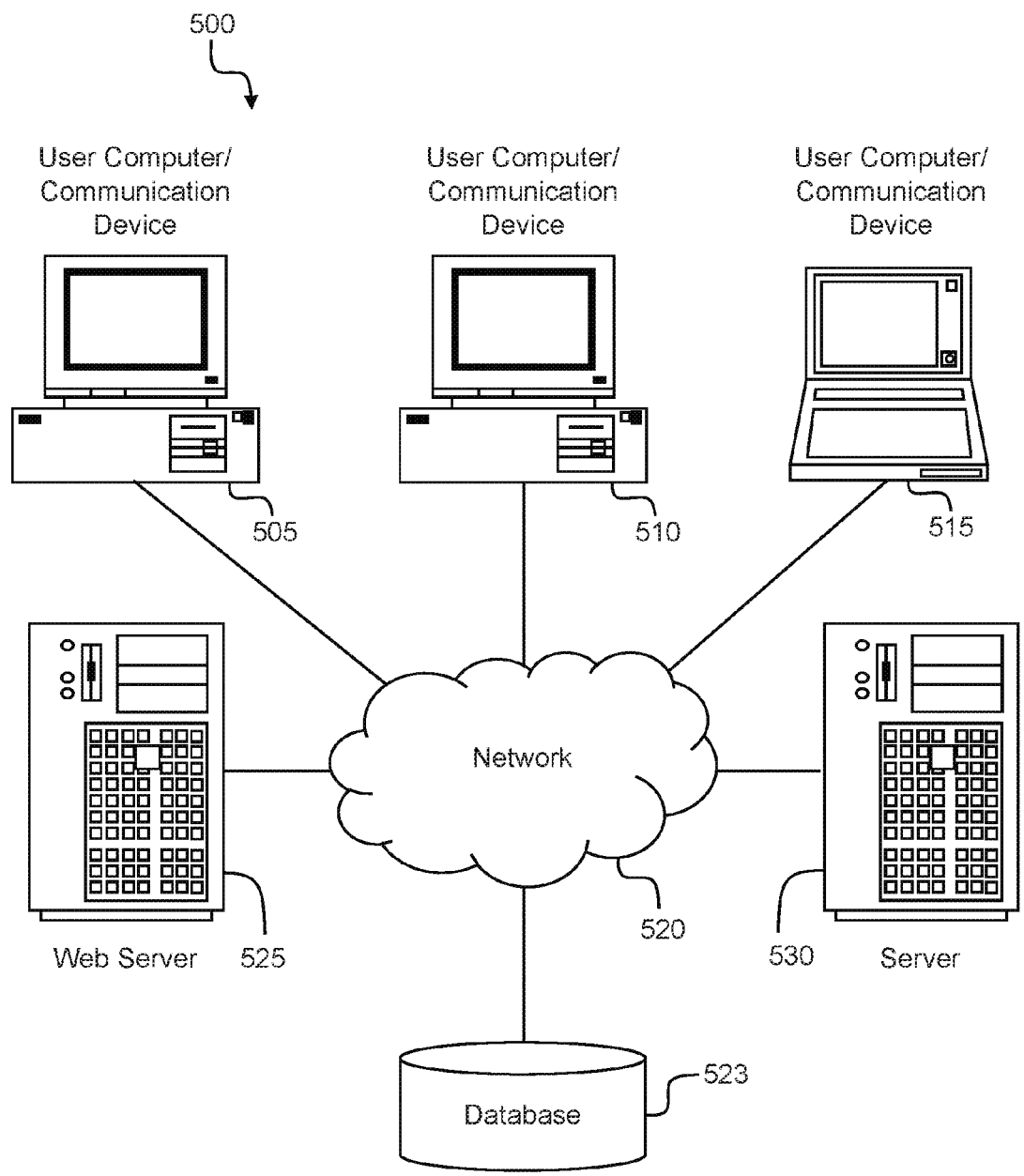
FIG. 5 is a block diagram of an embodiment of a computing environment.
Figure 6:
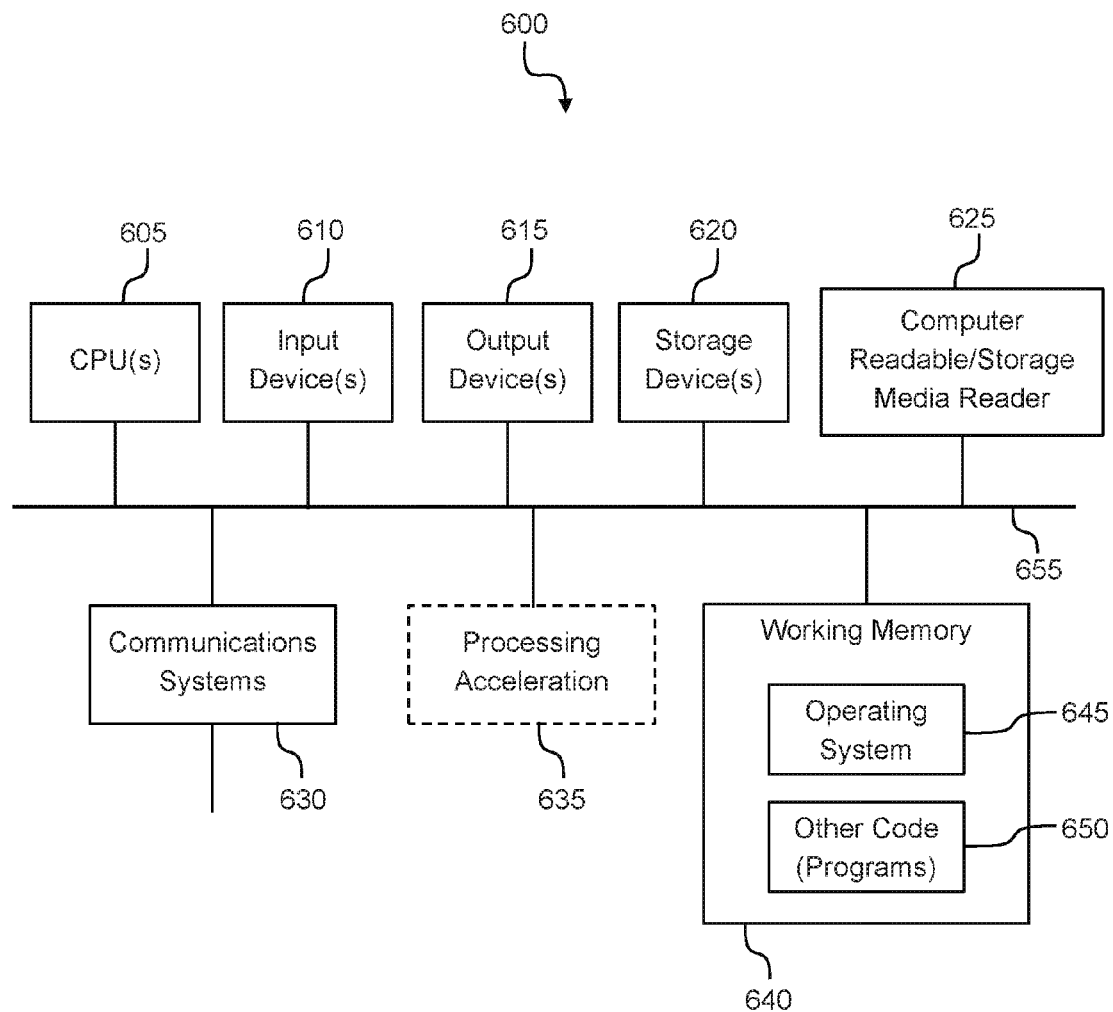
FIG. 6 is a block diagram of an embodiment of a computer system.

The message history database 222 may be any database or data storage system as described in conjunction with FIGS. 5 and 6. Thus, the message history database 222 may store data in data fields, objects, or other data structures to allow other systems to retrieve that information at a later time. The message history database 222 may store previous messages or information about previous messages. Thus, for example, if the trend analysis component 212 is analyzing several messages over a period of time, the trend analysis component 212 may retrieve information about previous messages associated with the current analysis from the message history database 222. As such, the trend analysis component 212 may better detect trends occurring at the social media networks 112, 114, and/or 116. The data stored by the message history database 222 may include the entire message or only a portion of the message, and in some circumstances, include metadata about the message(s).

The heuristic rules and dialogs database 218 may be any type of database or data storage system as described in conjunction with FIGS. 5 and 6. The heuristic rules and dialogs database 218 may store information in data fields, data objects, and/or any other data structures. An example of information stored within the heuristic rules and dialogs database 218 is described in conjunction with FIG. 3. The heuristic rules and dialogs database 218 stores rules and dialogs data structures that automate responses to received social media messages. The dialog data structures control the interaction between the dialog core 210 and the social media network 112, 114, and/or 116. The dialogs or heuristic rules may be created by a dialog creator 220. Thus, the dialog creator 220 may interface with user input 226 to receive information about dialogs. The user input 226 is then used to form the states and responses for a dialog data structure.

An agent interface 224 is a communication system operable to send action items to contact center agents 228 in the contact center 102. An agent may be a person or other system that is operable to respond to certain questions or requests from a customer. For example, the agent 228 may be a person that has specialized expertise in a topic area, such as technical support. The agent interface 224 may format the social message into an action item and forward that message to one or more agents 228. The agent interface 224 may also receive response(s) back from the agents 228. The information provided by the agent 228 may be used by the dialog core 210 to complete a response to the social media message. For example, the information may classify the social media message (e.g., sales, service, etc.). In other embodiments, the response is a complete response to the social media message that may be posted to the social media network 112, 114, and/or 116.

Figure 3:
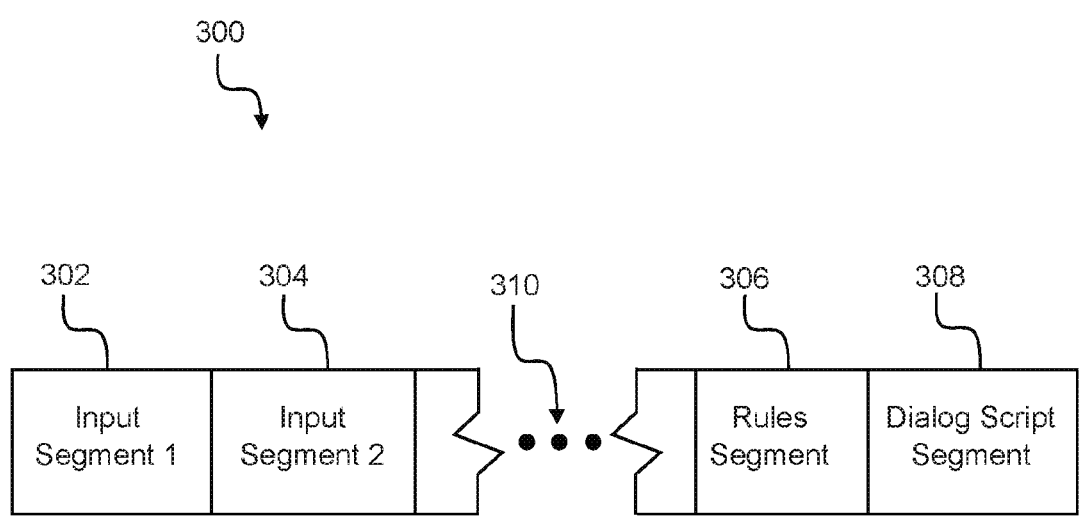
FIG. 3 is a block diagram of an embodiment of a dialog data structure.

An embodiment of a dialog data structure 300 is shown in FIG. 3. The dialog data structure 300 may be stored in several different forms of databases, such as relational databases, flat files, object-oriented databases, etc. Thus, while the term "data field" or "segment" is used herein, the data may be stored in an object, an attribute of an object, or some other form of data structure. Further, the dialog data structure 300 may be stored, retrieved, sent, or received during the processing of dialogs by the dialog core 210 or the dialog creator 220. The dialog data structure 300 stores one or more items of information in one or more segments. The numeric identifiers (e.g. 302, 304, etc.) shown in FIG. 3 may identify, the one or more segments.

The dialog data structure 300 may include one or more input segments, such as input segment 1 302 and input segment 2 304, a rules segment 306, and/or a dialog script segment 308. Input segments 302 and 304 each include one or more inputs that may be required to associate a social media message with the dialog data structure 300. The inputs segments 302 and 304 may include a customer identity, a respective customer type, a text word, a phrase, or other information that indicates that the dialog data structure 300 is associated with or pertaining to the social media messages.

The input segments 302 and 304 may also include certain trends that the trend analysis component 212 may identify. As such, if a trend is identified and associated with the inputs 302 and/or 304, the dialog data structure 300 may be retrieved and used by the dialog core 210. While there are only two input segments 302 and 304 shown in FIG. 3, there may be more or fewer input segments associated with the dialog data structure 300, as indicated by ellipsis 310.

The rules segment 306 may include one or more heuristic rules that either help with the association of the respective dialog data structure 300 with the social media message or control the interaction between the dialog core 210 and the social media customer. For example, the rules segment 306 may include a rule stating that the dialog data structure 300 applies only if the social media message includes input segment 1 302 but not input segment 2 304. One skilled in the art will be able to identify other types of rules that may govern the association of the dialog data structure 300 with the social media message. In other embodiments, the rules segment 306 states that if the social media message includes inputs 302 and/or 304, then the dialog core 210 should respond with a certain type of action.

Generally, a dialog script segment 308 includes a script of actions or responses that direct one or more other components, such as the dialog core 210 (FIG. 2B), to conduct actions or send the responses. The dialog script segment 308 may include the one or more states and corresponding responses or actions required by the dialog core 210. If the dialog script segment 308 applies (that is, if the social media message is requesting a certain type of information), the dialog script segment 308 may include the one or more responses that the dialog core 210 should communicate to respond to that social media message. The dialog script segment 308 may also include a response and a pointer to another dialog script segment 308 or another dialog data structure 300. Further, the dialog script segment 308 may have one or more actions that may be taken by another component after a secondary response is received by a customer. Thus, the dialog script segment 308 may direct or instruct an interaction to continue with a social media user over a period of time and over several interactions between the user and the contact center 102.

It should be noted that the dialog script segment 308 may reference one or more other dialog data structures 300. Thus, the dialog script segment 308 may direct the dialog core 210 to reference at least one other dialog data structure 300 to further act on the social media message. Further, the social media message may be subject of two or more dialog script segments 308, and direct the dialog core 210 to complete two dialog script segments 308 on the social media message. Also, dialog script segments 308 may not be associated with a response but direct the dialog core 210 to complete other actions, such as populating databases or gathering information. A Social Media Manager (SMM) dialog engine and associated dialog scripts/programs may play a role in identification of a trend and in modifications to ASR grammars used by the dialog engine for the IVR and/or ASR systems, along with associated dialog scripts/programs. The SMM dialog script/application may receive an indication that a new trend has been identified or an old trend retired. The SMM dialog engine may then extract vocabulary associated with the new trend or old trend, with assistance of the text analysis engine, and request an update to the IVR dialog script/application and/or ASR engine to include or remove the vocabulary identified with the trend. In another embodiment, the SMM dialog may post the information and context to a separate module that would determine the proper insertion or removal of the identified vocabulary.

Embodiments in accordance with the present invention are able to monitor and gather social media data items (e.g., tweets, Facebook® posts, blog entries, etc.). The social media data items are processed by recognizing information, extracting information and/or categorizing information. The processed information is then imported into the contact center 102 as work items to be further processed and/or analyzed by automated agents or by live agents. The resulting analyzed social media data has many applications as a dynamic data source.

Social media monitoring and analysis is used to detect trending topics, sentiment spikes, and other events interesting to an enterprises contact center. With this information, the invention dynamically adjusts IVR grammars, call flows, and prompts for callers during the duration of the detected event. Adjustments may also include changing weights associated with potential matches to items in a lexicon, adding items to the lexicon, and/or deleting items from the lexicon. ASR weighting is also adjusted to influence speech recognition results and routing of speech-based self-service applications.

Public social sources may include the following: Twitter®, Facebook®, LinkedIn®, YouTube®, blogs, RSS, search sites (Google®, Bing®, etc.), etc. Any site where users may post information about themselves or comment about current events and make that information available for social networking purposes may be used as a source of social information.

Embodiments in accordance with the present invention include a continuously running social media monitoring system that looks for characteristics such as trends, new topics, and sentimental spikes. This system will monitor all sites configured. Interactions are monitored and processed in real-time, producing up-to-the minute analysis of the state of the configured topics. Furthermore, any unknown topic, sentiment, or trend items are noted and produce similar notifications. The analysis may include a combination of standard methods in cloud-based services and internally created analysis of characteristics including text processing, part of speech analysis, language identification, classification methods, location-based information, time-based information, etc.

Topics may be configured depending upon the monitored social media channels. For example, in Twitter®, the social media gateway may be configured by the user to search for a set of terms, e.g., an airline might put in their airline name, initials (Delta™, DL), and terms like "flight", "ticket", "plane", "tarmac", etc. An SMM may allow a user to establish a context of when those words are relevant and when they are not relevant. To illustrate, "Delta" may also be associated with Delta® Faucets, a college fraternity or sorority, a river delta, and so forth. The context of a potentially ambiguous search term like "Delta" is established by selecting a set of related terms that must appear with a search term before a hit of the search term is considered to be relevant. For example, for the search term "Delta," the system may be configured to search for related terms like "airline", "flight", "ticket" in context with "Delta" to distinguish tweets on airline topics from other topic domains.

An SMM may also have an ability to receive @mention and direct message type tweets. An @mention is a type of tweet that contain text such as "@<twitterhandle>," where the <twitterhandle> is the name of another user on twitter. For example, Delta Airlines may establish a twitter handle "DeltaAssist" to allow customers to communicate with Delta social media associates. Direct message tweets are a non-public person-to-person communications channel that Twitter® supports for users that are followers of each other. For both @mention and direct message tweets, the social media message is specifically addressed to the company, so topic configuration should not be necessary because such tweets are assumed to be "on-topic." For other social media channels (e.g., Facebook®, LinkedIn®, the company may establish a "page" as an anchor point for conversations. The content of the conversations on that page are assumed to be on the topics related to the company because, e.g., one typically would not post a message about Delta Faucets on the Delta Airlines Facebook page. Spam filters may also be useful in ensuring that posts are on-topic.

The notification interactions are configured to trigger action by the contact center IVR/ASR systems. The action may include an initial reconfiguration of the IVR/ASR systems, and/or provisioning a duration of the reconfiguration, and/or provisioning that the reconfiguration is intended to be of indefinite duration, and/or the notifying a user of unforeseen triggers or states. For example, a power outage event may be designed or set up to trigger an action that will last until the action is manually reset. In another example, a generic service disruption may have a duration of, e.g., 60 minutes after an end of a trend is detected, or 60 minutes after a sentiment spike has returned to normal levels.

An aspect of the invention is the handling of unknown events, such as unanticipated critical service events that may occur. Monitoring social channels may provide notification of these events before traditional incoming channel calls are affected by these critical service events. Critical service events may trigger certain actions. First, the IVR/ASR system may be notified of an unknown service event, triggering some default processing in response. Second, a notification trigger may be sent to notify an appropriate workflow chain to analyze and deal with the new event. This may include manual changes to the IVR/ASR systems, both in monitoring and in the contact center.

For example, if a weather event or natural disaster occurs (e.g., a tornado outbreak; an earthquake; a volcanic ash eruption, etc.), there may be unanticipated travel disruption throughout a region. Early notification through social channels would provide early warning of an increased call volume to come.

Once an IVR/ASR system has received the notification information, the system may dynamically adjust its user interface by adding/deleting/changing available options, menus, prompts, grammar processing, workflow (i.e., the sequence in which a work item is handled in a contact center), or adding/deleting entries in an ASR lexicon, etc., in order to accommodate the events as detected from the changing social state, i.e., from changes in social information posted on social networking sites. For example, the notifications may affect a single prompt, may cause a change in order of individual menu items within a list, may cause new menu item to be added to accommodate the new event, and so forth. In addition, the system may be configured to activate an entire dialog module that replaces or augments large parts of the response/routing system. In another embodiment in accordance with the present invention, only back end routing parameters are changed with no difference visible to the caller. Back end routing parameters may refer to data that a work flow engine or underlying call routing/handling switch may use to make an assignment of a call to a specific resource (e.g., contact center agent, IVR, etc.) within a contact center. For example, a trend might place callers with "volcano" issues into a different queue than they might have gone into based on their CRM demographic. Work flows use data to make routing determinations, and the data used for those routing decisions may be modified by an identified trend.

An ASR engine may also receive the notification information, and may dynamically change weights associated with candidate matches (i.e., candidate matching words or phrases) to detected speech. Speech recognition often operates based upon a list of probable results. Current events and events and trends deduced or inferred from social media changes the probability that certain words would be spoken. Embodiments in accordance with the present invention may use the notification information to adjust or weight up or down the probability of match of a spoken word to a word in an ASR dictionary.

For example, suppose it is known through social media channels that there exists a condition such as a snowstorm in a major city. Words associated with a snowstorm or its effects may temporarily become more common. For example, callers to a travel reservation calling center may speak certain words more often, such as "change reservation" or "reschedule" or "snow", and so forth. More generally, if a list of the top "n" (e.g., top three) matches to a particular spoken word is determined based upon a calculated correlation (or other method for matching), and the list is presented in descending percentage of match, all without the benefit of social media information, then a match may be selected that is not necessarily the best match as long as it is within a predetermined percentage of the best match, and as long as the selected match further positively correlates with a word mined from the social media channel.

Alternatively, the data mined from the social media information may be used to adjust (e.g., boost up or down) the calculated correlation, weighting, or other method for matching the spoken word, to produce a combined weighting. The selected word would then be selected as the top match based on the combined weighting.

An ASR system in accordance with an embodiment of the present invention may provide greater control by the system over the prompt and response interactions with a user. The system may provide an adaptable platform that provides flexibility in response to data mined from social media sources, or in response to voice responses from users. For example, in a user-initiated dialogue ASR system, a user calling in may be provided with an open-ended greeting when the call is answered by the ASR system, such as "How may I help you?" A lexicon used to recognize utterances (e.g., speech) from users may be augmented, or a supplemental lexicon may be modified and used together with a core lexicon, to add words related to topics whose interest and usage is trending higher in social media channels.

Additions to a lexicon recognized based upon data mining of social media channels may attempt to estimate persistence of the newly recognized words and phrases. For example, low persistence words and phrases such as those related to a transient and low-recurring event or phenomenon (e.g., weather event, earthquake, volcanic ash, etc.) may be expected to occur less frequently as the transient phenomenon changes from being a present event to being a historical event. However, high persistence words and phrases such as those related to a non-transient or permanent event (e.g., renaming of an airport) or high-recurrence event (e.g., traffic jams, etc.) that may be expected to be encountered in the future, even if presently the frequency of usage of those words and phrases may decline below a predetermined threshold, or even if a certain amount of time has passed. Such high persistence words and phrases may be retained in the lexicon in order to reduce mismatches during a startup or training period if those words and phrases start trending higher again.

Embodiments in accordance with the present invention provide a social media engine that monitors social media channels for subject matter in the domain of interest, e.g., air traffic, for words and phrases related to the domain of interest, such as trips, etc., in order to find out whether there are new topics, and therefore new vocabularies that are being used by the public and that may be added to a lexicon used by the ASR system.

Embodiments in accordance with the present invention may also adjust weighting factors for words and phrases that are related to topics data mined from social media channels. For example, if the word "volcano" or phrase "volcanic ash" or "ash cloud" is detected more frequently in social media channels, then an embodiment of a system may add to the lexicon, or provide greater weighting to, related words and phrases such as "rebook", "reservations", "flight delays", "hotel", "weather forecast", and so forth. When such words and phrases are encountered, the actions taken by some embodiments may be to map actions to existing options in the ASR system. In other embodiments, new routing branches in the ASR system may be added (or removed) to handle changes in the types of inquiries based upon the trend of topics data-mined from social media channels.

Embodiments may adjust a recognition grammar. Recognition grammar is a set of word patterns that informs an ASR system what to expect a human to say. Embodiments add words and phrases to the recognition grammar based upon social media channels, and may also later remove or reduce the weighting in the recognition grammar of the added words and phrases as their usage in social media channels declines.

Embodiments may analyze a structure of the words and phrases detected from social media channels. For example, detecting the words "ash" and "volcanic" in isolation in the social media channels is a result that has a certain level of importance and may trigger a relatively minor change in the response of the ASR system. However, detecting a more specific phrase such as "volcanic ash" may trigger a relatively greater change in the response of the ASR system because it is more specific and therefore deemed to be of a higher level of importance. Users who use more specific phrases are more likely to refer to a known kind of event and may therefore trigger a more specific change in the response of the ASR system. Therefore, there are at least two aspects to what may be learned from the line of social media channel data trends. First, the grammar aspects, i.e., the structure of ASR, may be changed in response to the social media channel data. Second, new words and phrases are added to the lexicon.

As a condition triggering the change in the response of the ASR system ebbs or is ameliorated, the weighting adjustment may be lessened. A shaped sliding window (e.g., bell curve, hamming window, triangular, etc.) may be useful for calculating a magnitude of time-based changes to the weighting adjustment. In some embodiments, words or terms added to a lexicon that are not expected to be permanent additions may be removed once their usage in social media channels has fallen below a predetermined threshold for at least a predetermined length of time. Once the condition has essentially passed, normal ASR operation would resume.

Figure 4:
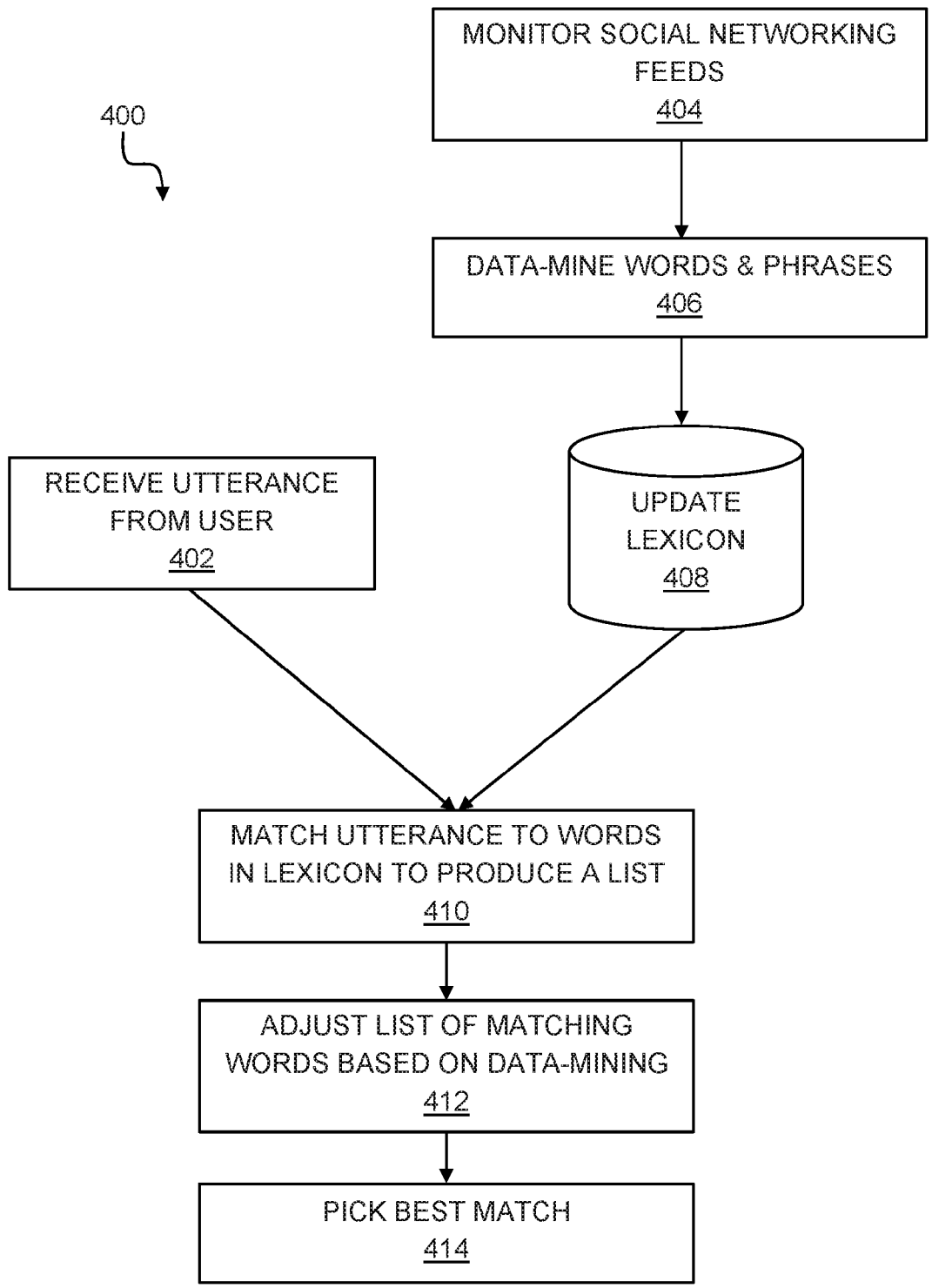
FIG. 4 is a method in accordance with an embodiment of the present invention.

FIG. 4 illustrates a method 400 in accordance with an embodiment of the present invention. At step 402, an utterance is received from a user or the user's telephone. Method 400 may assume that the utterance represents speech signals from the user rather than other noises (e.g., coughing, clearing throat, whistling, background noises, touch tones, etc.). In parallel at step 404, social network feeds are monitored substantially continuously. At step 406, the social network feeds are data-mined for words and phrases. Calculations based upon the mined words and phrases may also be performed, such as trending analysis, time windowing, etc. At step 408, a lexicon is updated with any new words or phrases that should be added to the lexicon. The lexicon may also be updated in step 408 to remove non-core words or phrases that were previously added but may now be deleted. Updates to the lexicon may be made, for example, by either editing a single lexicon or (if there is both a core lexicon and a supplemental lexicon) by editing the supplemental lexicon.

At step 410, an ASR engine matches the speech signals received in step 402 to words from the lexicon as updated in step 408, in order to produce a list of one or more candidate matches. The list of candidate matches may further have associated with each candidate match a score, percentage, or other indicator of a goodness of fit (generically, a "score") of the speech signals received in step 402 to each of the matching words and/or phrases from the updated lexicon. At step 412, the list of matching words or phrases may be adjusted based upon the results of words and phrases data-mined in step 406. For example, if the matching words and/or phrases include a score, the score may be adjusted up or down, or the ranking of matching words or phrases within the list may be otherwise adjusted. If the score of a matching word and/or phrase from step 406 is within a predetermined limit of a score of a next higher matching word and/or phrase from the core lexicon, the rank order of the matching word and/or phrase from step 406 may be promoted higher.

At step 414, a best match is picked from the adjusted list of matching words calculated from step 412.

FIG. 5 illustrates a block diagram of a computing environment 500 that may function as servers, computers, or other systems provided herein. The environment 500 includes one or more user computers 505, 510, and 515. The user computers 505, 510, and 515 may be general purpose personal computers (including, merely by way of example, personal computers, and/or laptop computers running various versions of Microsoft® Corp.'s Windows® and/or Apple® Corp.'s Macintosh™ operating systems) and/or workstation computers running any of a variety of commercially-available UNIX™ or UNIX-like operating systems. These user computers 505, 510, and 515 may also have any of a variety of applications, including for example, database client and/or server applications, and web browser applications. Alternatively, the user computers 505, 510, and 515 may be any other electronic device, such as a thin-client computer, Internet-enabled mobile telephone, and/or personal digital assistant, capable of communicating via a network 520 and/or displaying and navigating web pages or other types of electronic documents. Although the exemplary computer environment 500 is shown with three user computers, any number of user computers may be supported.

Environment 500 further includes a network 520. The network 520 may be any type of network familiar to those skilled in the art that may support data communications using any of a variety of commercially-available protocols, including without limitation SIP, TCP/IP, SNA, IPX, AppleTalk®, and the like. Merely by way of example, the network 520 maybe a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server 525 and 530. In this example, server 525 is shown as a web server and server 530 is shown as an application server. The web server 525, which may be used to process requests for web pages or other electronic documents from user computers 505, 510, and 515, may be running an operating system including any of those discussed above, as well as any commercially-available server operating systems. The web server 525 may also run a variety of server applications, including SIP servers, HTTP servers, FTP servers, CGI servers, database servers, Java® servers, and the like. In some instances, the web server 525 may publish operations available operations as one or more web services.

The environment 500 may also include one or more file and or/application servers 530, which may, in addition to an operating system, include one or more applications accessible by a client running on one or more of the user computers 505, 510, and 515. The server(s) 530 and/or 525 may be one or more general purpose computers capable of executing programs or scripts in response to the user computers 505, 510, and 515. As one example, the server 530 and/or 525 may execute one or more web applications. The web application may be implemented as one or more scripts or programs written in any programming language, such as Java®, C, C#, or C++, and/or any scripting language, such as Perl®, Python®, or TCL, as well as combinations of any programming/scripting languages. The application server(s) 530 may also include database servers, including without limitation those commercially available from Oracle®, Microsoft®, Sybase®, IBM® and the like, which may process requests from database clients running on a user computer 505.

The web pages created by the server 525 and/or 530 may be forwarded to a user computer 505 via a web (file) server 525 and/or 530. Similarly, the web server 525 may be able to receive web page requests, web services invocations, and/or input data from a user computer 505 and may forward the web page requests and/or input data to the web (application) server 530. In further embodiments, the web server 530 may function as a file server. Although for ease of description FIG. 5 illustrates a separate web server 525 and file/application server 530, those skilled in the art will recognize that the functions described with respect to servers 525 and 530 may be performed by a single server and/or a plurality of specialized servers, depending on implementation-specific needs and parameters. The computer systems 505, 510, and 515, web (file) server 525 and/or web (application) server 530 may function as the system, devices, or components described in FIGS. 1-4.

The environment 500 may also include a database 535. The database 535 may reside in a variety of locations. By way of example, database 535 may reside on a storage medium local to (and/or resident in) one or more of the computers 505, 510, 515, 525, 530. Alternatively, it may be remote from any or all of the computers 505, 510, 515, 525, 530, and in communication (e.g., via the network 520) with one or more of these. The database 535 may reside in a storage-area network (SAN) familiar to those skilled in the art. Similarly, any necessary files for performing the functions attributed to the computers 505, 510, 515, 525, 530 may be stored locally on the respective computer and/or remotely, as appropriate. The database 535 may be a relational database, such as Oracle® 10i™, that is adapted to store, update, and retrieve data in response to SQL-formatted commands.

FIG. 6 illustrates one embodiment of a computer system 600 upon which the servers, computers, or other systems or components described herein may be deployed or executed. The computer system 600 is shown as comprising hardware elements that may be electrically coupled via a bus 655. The hardware elements may include one or more central processing units (CPUs) 605; one or more input devices 610 (e.g., a mouse, a keyboard, etc.); and one or more output devices 615 (e.g., a display device, a printer, etc.). The computer system 600 may also include one or more storage devices 620. By way of example, storage device(s) 620 may be disk drives, optical storage devices, solid-state storage devices such as a random access memory (RAM) and/or a read-only memory (ROM), which may be programmable, flash-updateable and/or the like.

The computer system 600 may additionally include a computer-readable storage media reader 625; a communications system 630 (e.g., a 1, a network card (wireless or wired), an infrared communication device, etc.); and working memory 640, which may include RAM and ROM devices as described above. The computer system 600 may also include a processing acceleration unit 635, which may include a DSP, a special-purpose processor, and/or the like.

The computer-readable storage media reader 625 may further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with the network 520 (FIG. 5) and/or any other computer described above with respect to the computer system 600. Moreover, as disclosed herein, the term "storage medium" may represent one or more devices for storing data, including ROM, RAM, magnetic RAM, core memory, magnetic disk storage mediums, optical storage mediums, flash memory devices and/or other machine readable mediums for storing information.

The computer system 600 may also comprise software elements, shown as being currently located within a working memory 640, including an operating system 645 and/or other code 650. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Embodiments in accordance with the present invention system may be directed to chat and/or IM dialog via a system-directed structured dialog. For such embodiments, trend terms may be mapped into existing call flow paths in the IVR and/or ASR application by the methods presented herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method to adjust a lexicon of at least one of an automatic speech recognition (ASR) engine or an interactive voice response (IVR) system of a contact center, the method comprising:
   receiving, by a computer-implemented social media gateway of the contact center, a plurality of messages from at least one social network, wherein each message comprises one or more message fields;
   grouping, by the computer-implemented social media gateway, based on a content of the respective one or more message fields, two or more of the messages to form a message grouping;
   data mining, by a computer-implemented dialog engine of the contact center, the message grouping to extract one or more characteristics;
   inferring, in real-time, by the computer-implemented dialog engine, based on the one or more extracted characteristics, a trend between the messages comprising the message grouping about a topic trending higher on the at least one social network;
   adding, by the computer-implemented dialog engine, one or more words or phrases related to the trend to the lexicon to generate a modified lexicon;
   receiving, by the ASR engine, a speech signal from a user; and
   matching, by the ASR engine, the speech signal to one or more words in the modified lexicon.

2. The method of claim 1, further comprising:
   calculating, by the computer-implemented dialog engine, a magnitude of adjustment to weights within the ASR engine of the added one or more words or phrases based upon a shaped sliding window.

3. The method of claim 2, further comprising:
adjusting, by the computer-implemented dialog engine, a speech recognition weighting of the ASR engine of the contact center based upon the calculated magnitude of adjustment.

4. The method of claim 3, further comprising:
estimating, by the computer-implemented dialog engine, a persistence of the trend; and
limiting, by the computer-implemented dialog engine, a duration of the adjustment to the speech recognition weighting based on the estimated persistence.

5. The method of claim 1, wherein matching the speech signal to words in the modified lexicon comprises:
producing a list of candidate matching words; and
ranking the list of candidate matching words.

6. The method of claim 5, wherein:
the list of candidate matching words comprises a highest ranked word and a lower ranked word;
the one or more words or phrases related to the trend that are added to the lexicon include the lower ranked word; and
matching the speech signal comprises:
matching, based on the topic trending higher on the at least one social network, the speech signal to the lower ranked word.

7. The method of claim 1, further comprising:
generating, by the computer-implemented dialog engine, a response to one or more of the plurality of messages.

8. The method of claim 7, wherein generating the response comprises one or more of:
creating one or more dialog data structures; or
retrieving one or more existing dialog data structures.

9. The method of claim 1, further comprising:
searching, by the computer-implemented social media gateway, the at least one social network for one or more of additional messages or user context information.

10. The method of claim 1, wherein the message grouping comprises messages from two or more different social networks.

11. A system of a contact center to adjust a lexicon of at least one of an automatic speech recognition (ASR) engine or an interactive voice response (IVR) system of the contact center, the system comprising:
a server comprising:
a computer-readable storage medium, storing executable instructions; and
a processor coupled to the computer-readable storage medium, the processor, when executing the executable instructions:
receives a plurality of messages from at least one social network, wherein each message comprises one or more message fields;
based on a content of the respective one or more message fields, groups two or more of the messages to form a message grouping;
data mines the message grouping to extract one or more characteristics;
based on the one or more extracted characteristics, infers, in real-time, a trend between the messages comprising the message grouping about a topic trending higher on the at least one social network:
adds one or more words or phrases related to the trend to the lexicon to generate a modified lexicon;
receives a speech signal from a user; and
matches the speech signal to one or more words in the modified lexicon.

12. The system of claim 11, wherein the processor, when executing the executable instructions:
calculates a magnitude of adjustment to weights within the ASR engine of the added one or more words or phrases based upon a shaped sliding window.

13. The system of claim 12, wherein the processor, when executing the executable instructions:
adjusts a speech recognition weighting of the ASR engine of the contact center based upon the calculated magnitude of adjustment.

14. The system of claim 13, wherein the processor, when executing the executable instructions:
estimates a persistence of the trend; and
limits a duration of the adjustment to the speech recognition weighting based on the estimated persistence.

15. The system of claim 11, wherein matching the speech signal comprises:
producing a list of candidate matching words; and
ranking the list of candidate matching words.

16. The system of claim 11, wherein the processor, when executing the executable instructions:
generates a response to one or more of the plurality of messages.

17. The system of claim 16, wherein generating the response comprises one or more of:
creating one or more dialog data structures; or
retrieving one or more existing dialog data structures.

18. The system of claim 11, wherein the processor, when executing the executable instructions:
searches the at least one social network for one or more of additional messages or user context information.

19. The system of claim 11, wherein the message grouping comprises messages from two or more different social networks.

20. A method for adjusting a lexicon of at least one of an automatic speech recognition (ASR) engine or an interactive voice response (IVR) system of a contact center, the method comprising:
receiving, by a computer-implemented social media gateway of the contact center, social media information from at least one social network;
data mining, by a computer-implemented dialog engine of the contact center, the social media information to extract one or more characteristics;
inferring, in real-time, by the computer-implemented dialog engine, based on the one or more extracted characteristics, a trend about a topic trending higher on the at least one social network;
modifying, by the computer-implemented dialog engine, the lexicon based on the trend to generate a modified lexicon, wherein modifying the lexicon comprises at least one of;
adding one or more words or phrases related to the trend to the lexicon; or deleting one or more words or phrases previously added to the lexicon based on a previous trendy
receiving, by the ASR engine, a speech signal from a user; and
matching, by the ASR engine, the speech signal to one or more words in the modified lexicon.

* * * * *